March 3, 1970 — S. S. NASH-BOULDEN — 3,498,565
MANEUVERABLE GLIDE PARACHUTE
Filed July 15, 1966 — 6 Sheets-Sheet 1
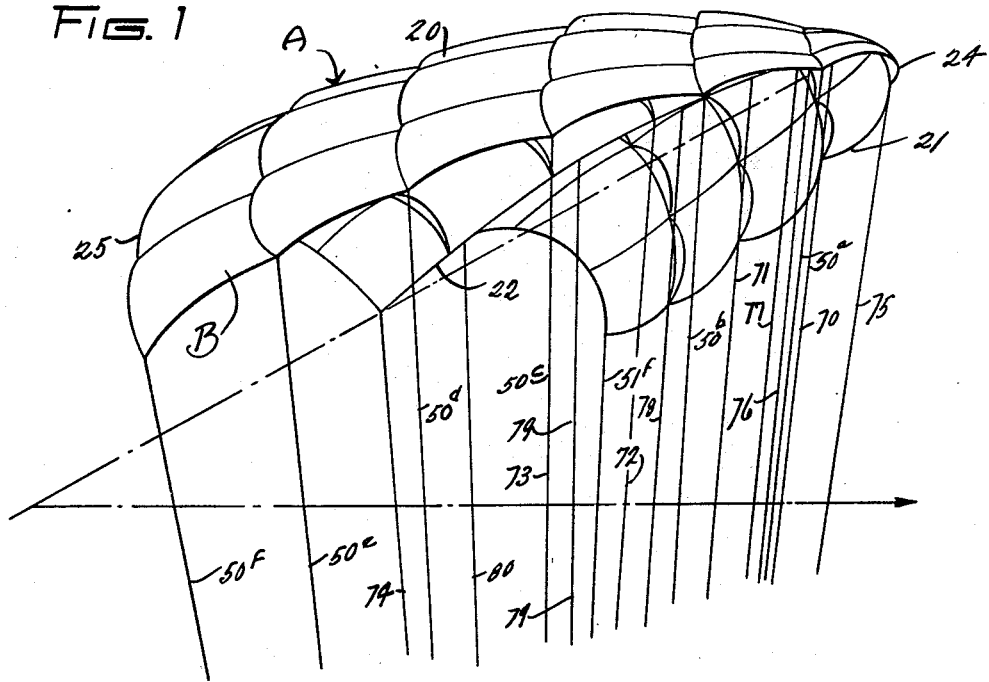
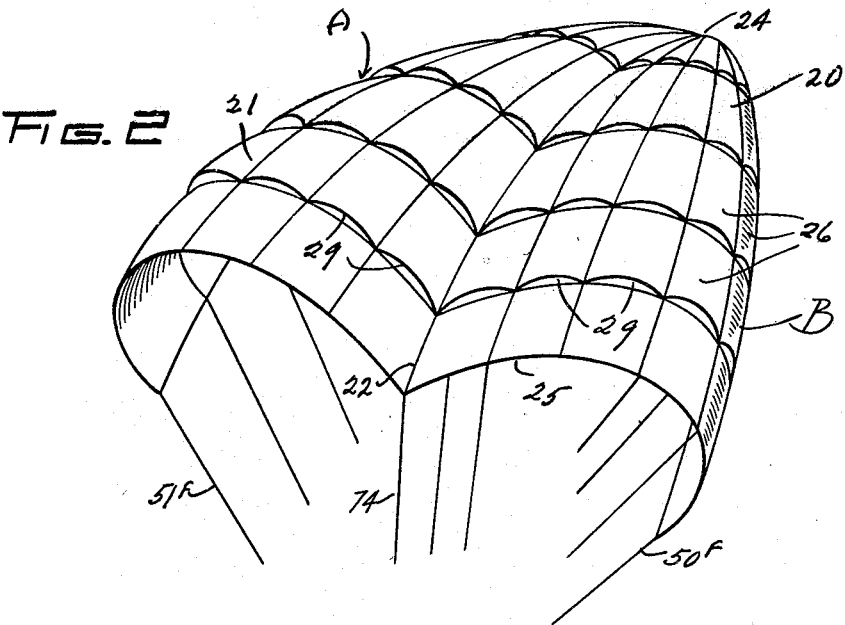
INVENTOR
S. S. Nash-Boulden
BY Rommel, Allwine & Rommel
ATTORNEYS

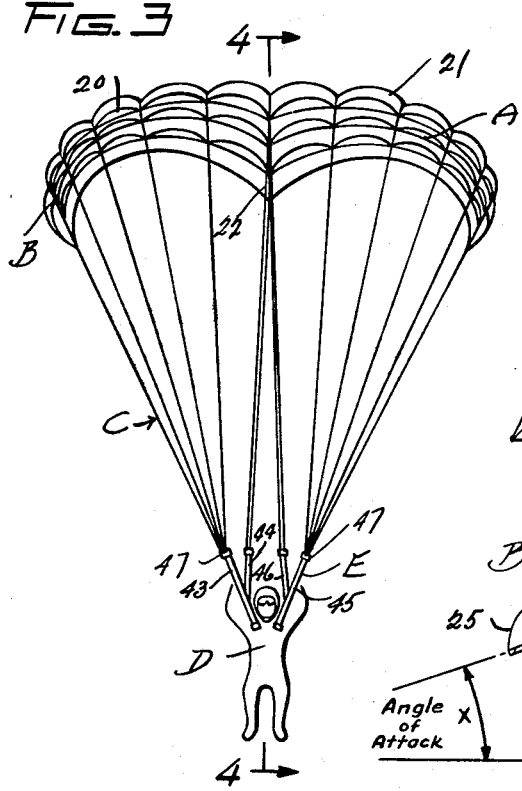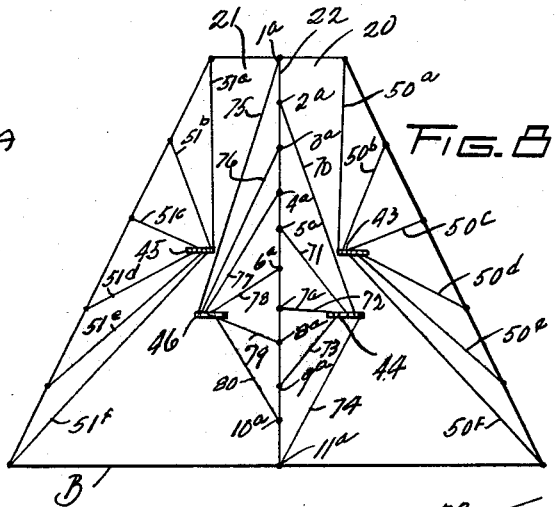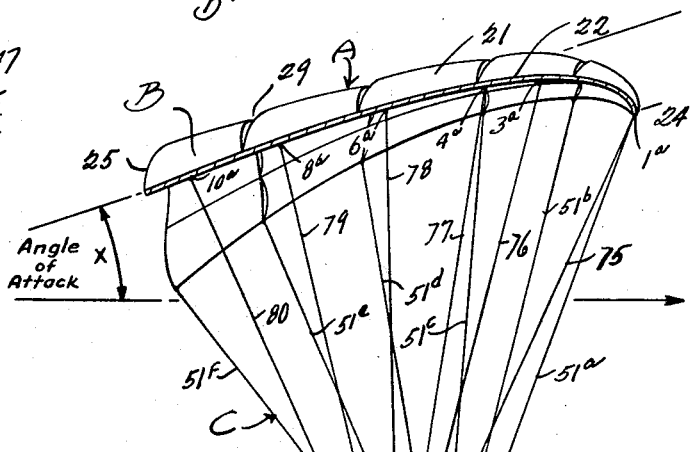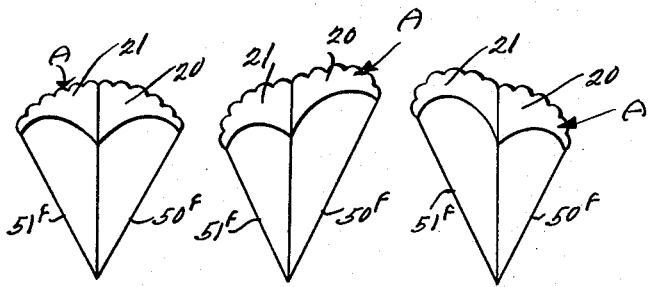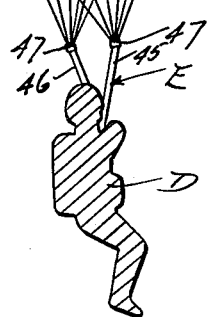

March 3, 1970  S. S. NASH-BOULDEN  3,498,565
MANEUVERABLE GLIDE PARACHUTE
Filed July 15, 1966  6 Sheets-Sheet 3
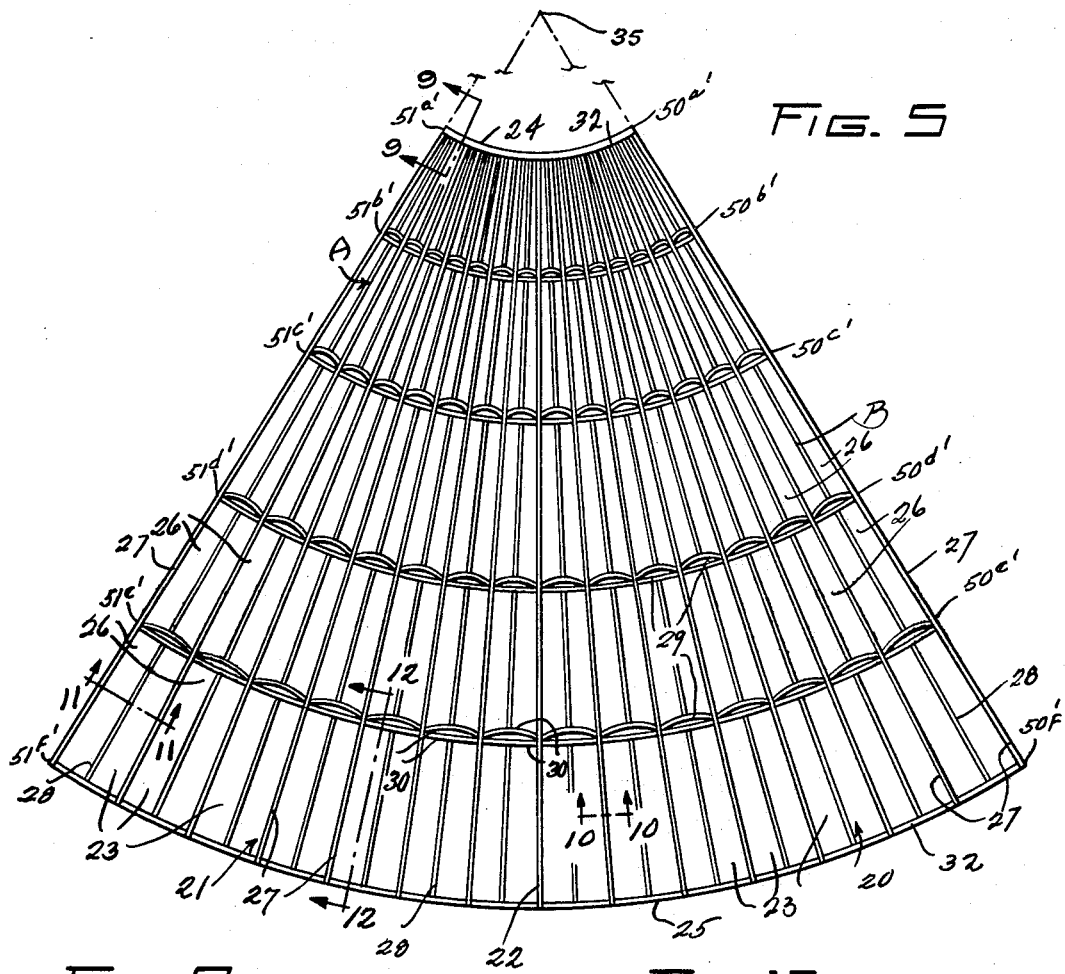
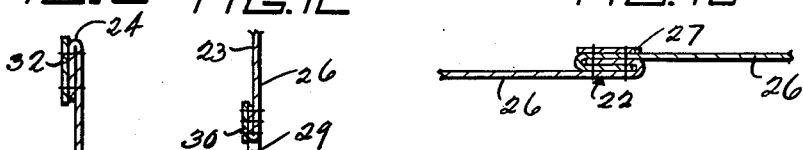
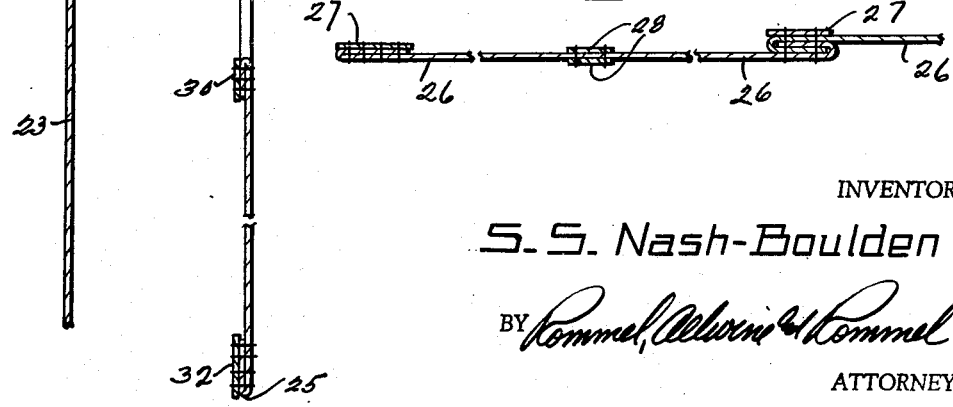
INVENTOR
S. S. Nash-Boulden
BY Rommel, Alworn & Rommel
ATTORNEYS

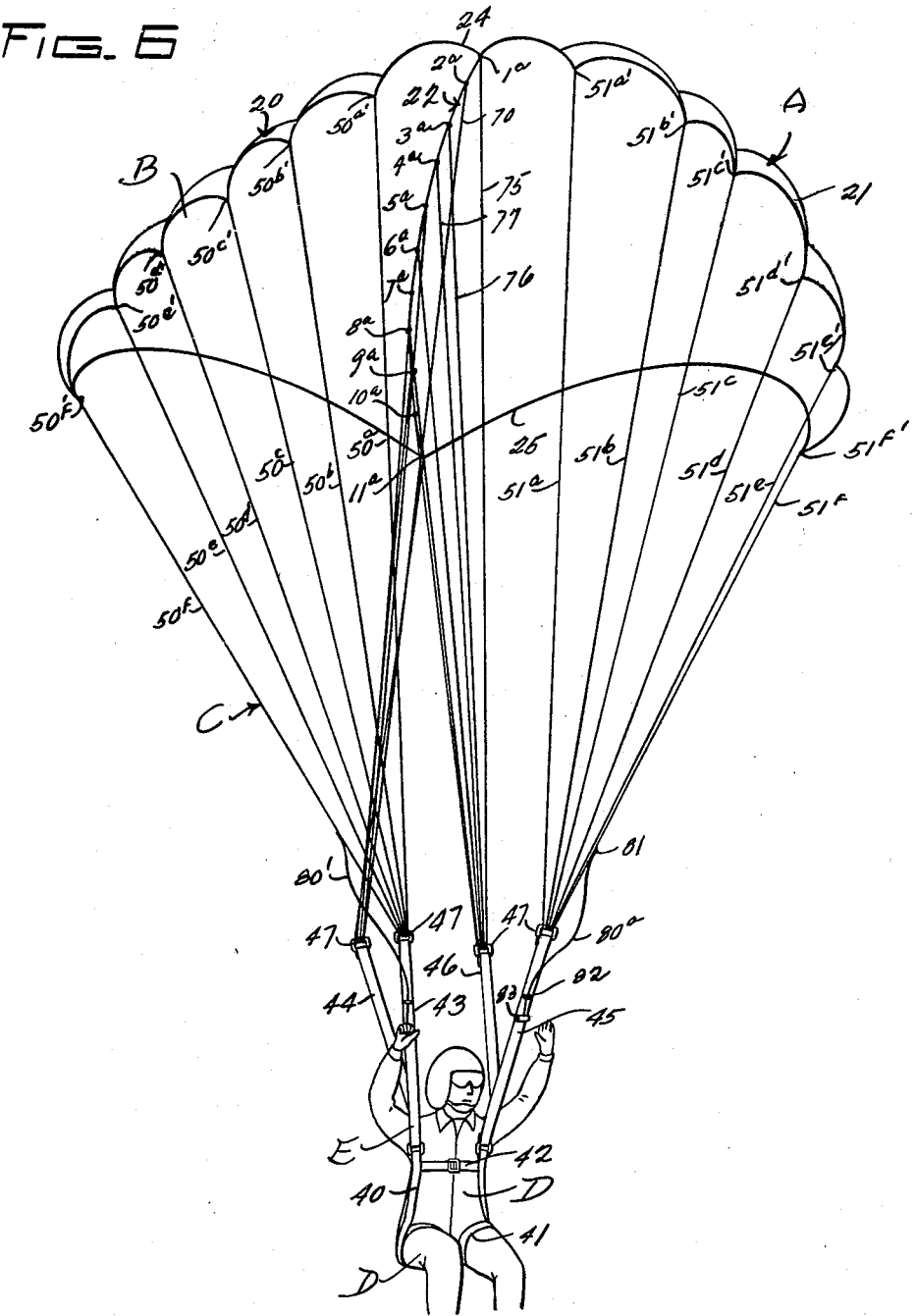

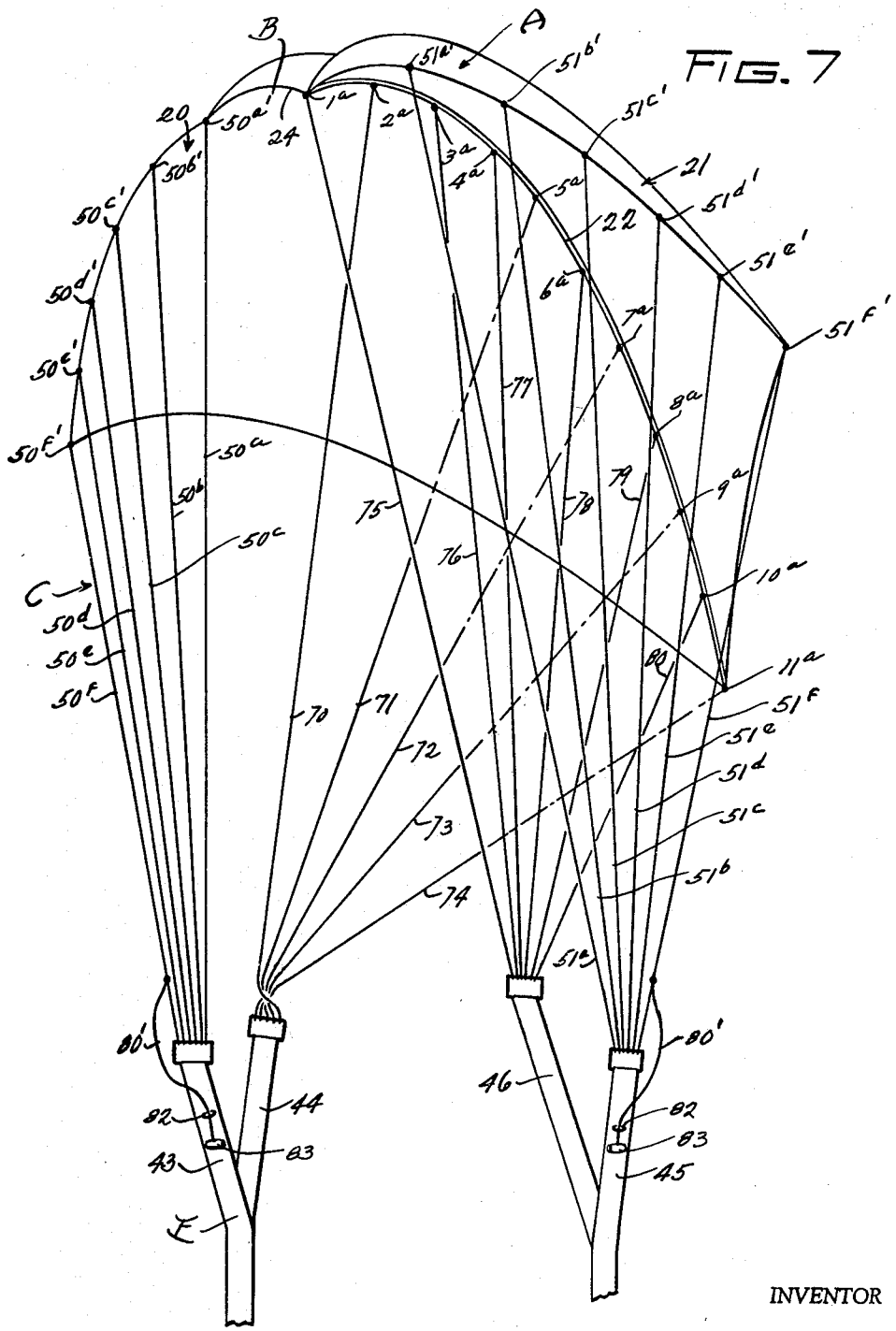

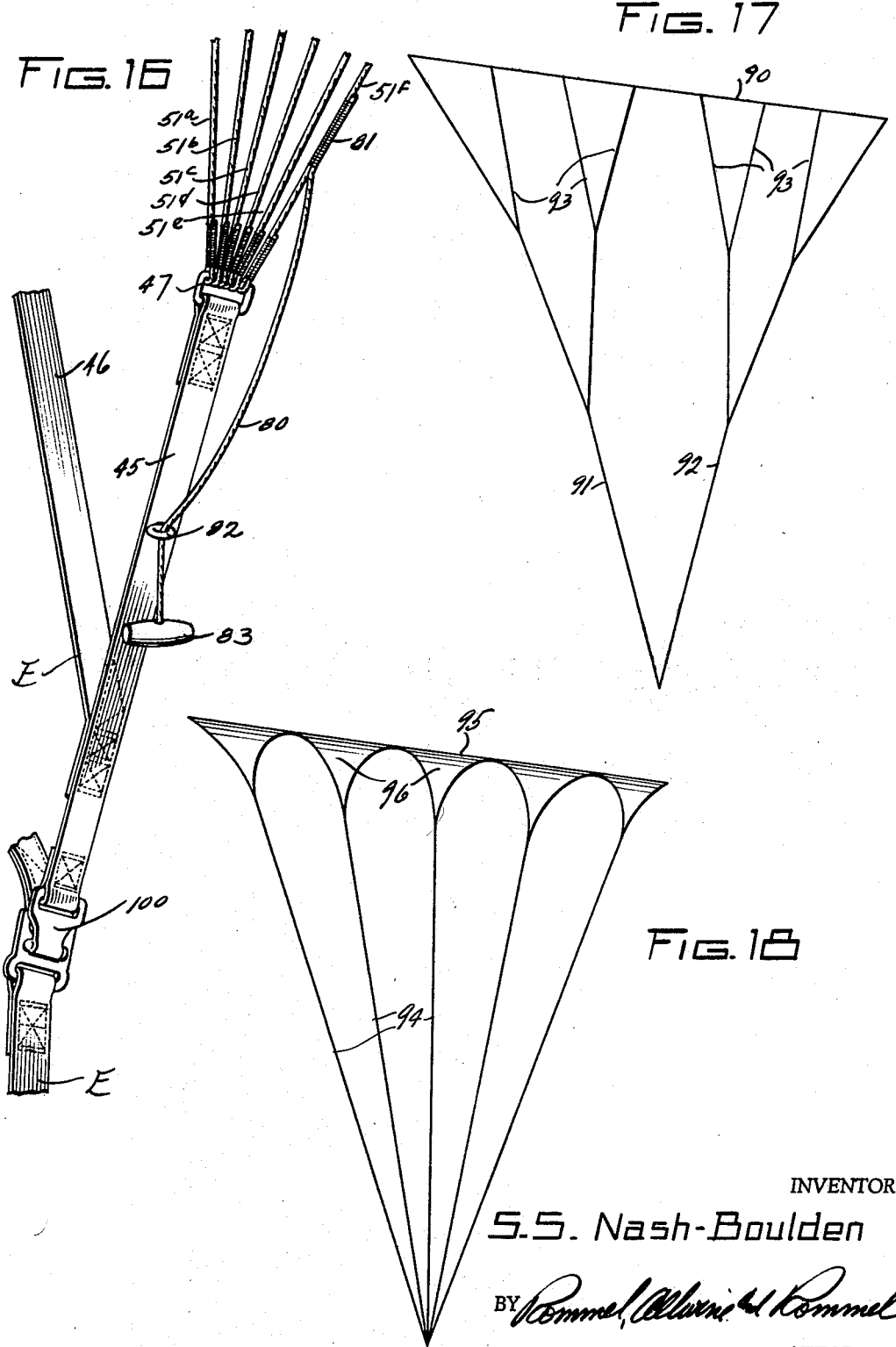

United States Patent Office 3,498,565
Patented Mar. 3, 1970

3,498,565
MANEUVERABLE GLIDE PARACHUTE
Stephen S. Nash-Boulden, Northridge, Calif., assignor to Irvin Industries Inc., Lexington, Ky., a corporation of New York
Filed July 15, 1966, Ser. No. 565,560
Int. Cl. B64d 17/18, 17/34
U.S. Cl. 244—152                               2 Claims

ABSTRACT OF THE DISCLOSURE

A parachute generically known as Parawing is a manually maneuverable glide parachute, including completely flexible canopy, shroud lines and a harness or other load supporting means in lieu of a harness. The harness or load supporting means has a control means by which the canopy can be guided during flight. The canopy comprises plural wing sections divided by a central keel assembly, the shroud lines are of such lengths with respect to the harness or load supporting means that the canopy will assume an acute angle to the horizontal during glide descent with a leading smaller width nose at an appreciable elevation above the trailing wider end. The canopy is provided with air spilling vents and has a truncated shape.

---

This invention relates to an improved parachute canopy and assembly having controlled maneuverability and glide manipulation.

Parachute canopies with glide characteristics have heretofore been provided, but performance has not been satisfactory because such canopies during descent are restricted by the tendency of the leading edge or skirt portion directed into the relative wind to buckle when a critical attitude and lift-drag ratio are reached. This condition produces unfavorable drag at the frontal area and consequently limits the gliding performance. It is therefore a primary object of the present invention to provide an improved parachute having a canopy and shroud line control means therefor capable of quick and easy deployment from its stowage shape with subsequent unassisted inflation and flight performance. It provides reliable performance, structural durability, and operational simplicity. In addition, it provides maximum suspended mass or load to wing mass ratio, growth adaptability, and avoidance of undesirable flight performance, such as critical instabilities, stalls, etc. In addition, the improved canopy provides low inflational shock loading during deployment.

The present invention includes a parachute canopy including a plurality of lobes or wing portions at each side of a central keel. The lobes or wings are completely flexible as are the control means such as shroud lines which may be connected to riser webs of a harness or to a control unit for remote control.

Other objects and advantages of this invention will be apparent during the course of the following detailed description.

In the accompanying drawings, forming a part of this specification, and wherein similar reference characters designate corresponding parts throughout the several views:

FIG. 1 is a perspective view of the inflated canopy in gliding flight taken from an angle at the right rear area, showing the two inflated wings and the keel line or zone.

FIG. 2 is a perspective view of the inflated parachute canopy looking forward from the trailing edge of the same.

FIG. 3 is a front elevation of the inflated canopy showing the shroud lines and their attachment to the riser webs of a parachutist's harness.

FIG. 4 is a longitudinal cross sectional view taken through the keel line of the inflated parachute canopy looking to the left and showing the control shroud lines attached from certain riser webs of a harness supporting an individual and also showing the angle of glide attack of the canopy.

FIG. 5 is a plan developed or flattened view of the canopy showing the panels and truncated shape of the same.

FIG. 6 is a front elevation of the inflated canopy, showing a parachutist wearing a harness and its riser webs to which are attached shroud lines which enable control of the canopy and which are attached to the side marginal portions of the wings and to the keel line or zone.

FIG. 7 is a perspective view of the inflated canopy taken from the front left side thereof, showing more particularly the control means, consisting of shroud lines which are extended from the riser webs of a load supporting harness, and particularly showing those shroud lines which are attached to the keel line or zone of the canopy.

FIG. 8 is a diagrammatic view showing the suspension or shroud line routing control attachment to riser webs and the keel zone of the canopy.

FIGS. 9, 10, 11 and 12 are cross sectional views taken substantially on the respective lines 9—9, 10—10, 11—11 and 12—12, shown in FIG. 5 of the drawings, and designating the structural formation of the canopy.

FIG. 13 is a diagrammatic view showing the parachute canopy in a neutral glide position.

FIG. 14 is a diagrammatic view showing the canopy and control lines as they would appear when making a left glide turn.

FIG. 15 is a diagrammatic view showing the canopy and control lines as they would appear in the making of a right hand glide turn.

FIG. 16 is a fragmentary view showing left side riser webs of a parachutist's harness and a control cord attached to the harness and in position for manipulation by the parachutist.

FIG. 17 is a diagrammatic view showing a modified form of impinging suspension line load dispersion technique, such as adaptable for large parachute canopies.

FIG. 18 is a diagrammatic view showing a modified form of keel line-keel load dispersion technique.

In the drawings, wherein for the purpose of illustration are shown different forms of the invention, the letter A may generally designate the glide parachute which may include a canopy B, attached by shroud line system C to a load. In case an individual D is using the improved parachute, a conventional harness E is employed to which the system of shroud lines C is connected in a manner to be subsequently described.

The canopy B, shown in plan view of FIG. 5, is in the general form of a trapezoid and comprises a pair of wings 20 and 21, connected along a keel line or portion 22. The wings 20 and 21 are generally of a trapezoidal shape. The canopy is here shown in its simplest form, that is, with a reference keel line or portion 22 and a single lobe type wing on each side thereof. If desired, more than one wing or lobe may be provided on each side of the keel line, and it is possible that more than one keel line may also be used. The material of the wings is preferably that in conventional use, with a predetermined controlled porosity, since increase in porosity will result in decreased glide performance. The material generally used is a basic nylon rip-stop cloth.

The make-up of the wings 20 and 21 follows to some extent conventional canopy practice in that each wing 20 and 21 is constructed of a plurality of trapezoidally shaped panels 23 each one extending from the leading edge 24 of the canopy to the trailing edge 25 thereof. These panels 23 are each formed of a plurality of segments 26 of trapezoidal shape as shown in FIG. 5. They are connected together by means of radial bands or tapes 27, shown in FIG. 11, which are suitably stitched to the interlocked margins of said segments. The segments 26 are additionally provided with radially disposed reinforcement consisting of tapes 28 suitably stitched thereto, as shown in FIG. 11. At the meeting juncture ends of the segments 26 of each panel 23 throughout the complete length of each panel there are provided air vents 29 which may open in louvered or in any other desired form. In FIG. 12 it is shown that the vents 29 are reinforced by tapes 30 stitched along the edges of the vent openings 29.

It will be noted from FIG. 5 that the leading edge 24 and trailing edge 25 of the canopy are each transversely arcuate in form and reinforced by tapes 32 stitched thereto in conventional manner. The focal point of the arcs at the leading and trailing edges is diagrammatically designated at 35 in FIG. 5 of the drawings. It is therefore apparent that the canopy B is made up of a pair of wings having complementary wing segments which are joined so they make an arcuate connection transversely of the canopy. The canopy shown has five ring assemblies as shown in FIG. 5, although the number is optional except that they should provide for proper air spill throughout the length of the canopy between the leading and trailing ends.

It should be mentioned that the vents 29 regulate the inflation characteristics of the canopy. They are arranged to reduce inflation shock forces to a very low level. The tapes, designated above, guard against skin tears in the panels. These vents provide for a completely maneuverable canopy with high performance concepts. They provide for air spill control resulting in stabilized glide performance.

The shroud line system C in the present form of invention is intended to be manipulated by the parachutist. In this connection the harness E as shown in FIG. 6 includes the usual seat sling 40, leg straps 41, cross straps 42 and at each side thereof there are pairs of riser webs consisting of right front riser web 43 and right rear riser web 44. On the left side of the harness is a left front riser web 45 and a rear left riser web 46. These riser webs are provided with the usual rings 47 at the ends thereof to which the shroud lines are connected.

The system of shroud lines C on the right side of the parachute comprises shroud lines $50^a$, $50^b$, $50^c$, $50^d$, $50^e$ and $50^f$ connected to the front riser web 43 at the right side of the canopy and harness. These shroud lines $50^a$, $50^b$, $50^c$, $50^d$, $50^e$ and $50^f$ are connected respectively at spaced intervals along the right side marginal edges of the right wing 20 at the location designated at $50^{a'}$, $50^{b'}$, $50^{c'}$, $50^{d'}$, $50^{e'}$ and $50^{f'}$, shown in FIGS. 6 and 7 of the drawings. On the left side of the canopy the shroud line system C comprises shroud lines $51^a$, $51^b$, $51^c$, $51^d$, $51^e$ and $51^f$, connected to the riser web 45. They are respectively attached to the left hand marginal portion of the wing 21 at the locations $51^{a'}$, $51^{b'}$, $51^{c'}$, $51^{d'}$, $51^{e'}$ and $51^{f'}$, shown in FIGS. 6 and 7.

Referring to FIG. 7, the keel line or zone 22 between the wings 20 and 21 is provided with a plurality of shroud line connecting points designated as $1^a$, $2^a$, $3^a$, $4^a$, $5^a$, $6^a$, $7^a$, $8^a$, $9^a$, $10^a$ and $11^a$. The shroud line system C is provided with shroud lines 70, 71, 72, 73 and 74 connected at the keel points $2^a$, $5^a$, $7^a$, $9^a$ and $11^a$. The last mentioned shroud lines are connected to the right rear riser web 44 of the harness as shown in FIG. 7. The remaining shroud lines designated at 75, 76, 77, 78, 79 and 80 are respectively connected to the left rear riser web 46 of the parachute harness at their lower ends and at their upper ends they are respectively connected to the keel points $1^a$, $3^a$, $4^a$, $6^a$, $8^a$ and $10^a$.

The shroud line system C is so arranged that when inflated the nose of the canopy B will forwardly be extended slight downwardly, but yet at an elevation above the trailing portion of the parachute. Thus, the keel line has an angle of attack, shown by the angle X in FIG. 4 of the drawings. This angle of attack is measured between the keel line of the inflated canopy and the relative flight pack of the canopy.

It will be noted from FIG. 6 that the front riser webs 43 and 45 of harness E are provided with control cords 80', which as shown in FIG. 16, are zig-zag stitched at 81 to selected shroud lines. The cord 80 from web 43 is connected with line $50^f$ and the line 80 of riser web 45 is connected to shroud line $51^f$. They are slidably extended through guide rings 82 on each of the webs 43 and 45 and terminate in hand grips 83 within easy access of the parachutist.

To perform a left hand turn of the canopy the parachutist pulls down on the left control grip 83 attached to the riser web 45 while simultaneously relaxing pull on the right hand control grip of the riser web 43. As shown in FIG. 14, this partially collapses the wing 21 and the parachutist makes a left-hand turn. On the other hand, if it is desired to make a right-hand turn, as shown in FIG. 15, the cord 80' on the riser web 43 is pulled and the other cord 80' of the riser web 45 is relaxed as shown in FIG. 6. This partially collapses the right-hand wing 20 and the canopy makes a right-hand turn. The pulling of the control cords 80' deflects the wing tips and provides an effect similar to operation of the aileron of an aircraft wing. The forward motion or glide can be reduced or modulated by the operator pulling down on the rear riser webs 44 and 46.

The harness E preferably includes the conventional personnel release mechanism 100.

Suspension line lengths vary with each design concept for the purpose of giving the proper angle of attack, center of pressure positioning and general shaping. As shown in FIG. 17, a keel line reference 90 may have suspension lines 91 and 92, as shown, with their upper ends divided into a plurality of keel line connected cords as shown at 93. Such an arrangement may be desirable in connection with the use of large canopies. Another keel line-keel load dispersion technique is shown in FIG. 18 and consists of the suspension lines 94 which may be connected to a keel line reference 95 by means of load dispersing fabric gussets 96.

So far as inflation is concerned, using current packing techniques, the canopy will inflate rapidly from the trailing edge to forward tip, yielding a deployed status to the wings. The forward tip fills span wise and the final canopy shape is realized as progressive aft inflation occurs. Louvers and slots for venting assist in regulating filling progression. The use of vents such as louvers, slots, etc., upon the canopy directionally control air streams to provide boundary layer flow control, shaping, thrusting and stability as well as other aerodynamic optimizations. Possible use of elastic materials to increase vent areas during initial high wing loading conditions may be necessary to reduce inflation shock loads and materials strength requirements.

As seen from the foregoing, a parachute has been provided, exhibiting high drag efficiency coupled with good guide and manuevering characteristics.

Various changes in the size, shape and arrangement of parts may be made to the forms of invention herein shown and described without departing from the spirit of the invention or scope of the claims.

I claim:
1. In a parachute construction, the combination of a canopy of flexible non-rigid material comprising a plurality of connected wing section divided by an intermediate keel portion, said wing sections and keel being completely flexible in all directions and free of any rigid supports, each wing section having a narrow leading end and a wider trailing end, shroud lines connected at their upper ends at the outer side marginal portions of said wing sections, other shroud lines connected at their upper ends along the intermediate keel portion, a load connection at the lower ends of said side and intermediate shroud lines remote from the canopy, said shroud lines all being so related as to length that the wing sections during a canopy descent upon inflation with a load attached to the load connection will each be separately lobed upwardly throughout their lengths between the leading and trailing ends thereof and between keel portions and outer side marginal portions thereof, the wing sections each being of trapezoidal shape and joined together having a narrow canopy leading end and an appreciably wider rear end, said wings sections each having relatively spaced air vents therein throughout the lengths of the same, the shroud lines lengths being so related to the load attaching connection that during gliding of the canopy the leading end will lie at an elevation appreciably higher than the trailing end to provide a definite acute angle of glide attack with respect to the horizontal.

2. The parachute construction defined in claim 1 in which the inflation shape of the canopy along the glide path is generally convexed in an upwardly facing direction with the leading end nosed downwardly below the side marginal edges of the wing sections and with the side marginal edges of the wing sections concavely arched between the leading and trailing ends.

References Cited

UNITED STATES PATENTS

| | | | |
|---|---|---|---|
| 2,825,515 | 3/1958 | Gold | 244—152 |
| 3,131,894 | 5/1964 | Jalbert | 244—152 |
| 3,289,976 | 12/1966 | Lemoigne | 244—152 X |
| 2,436,167 | 2/1948 | Gregory | 244—151 |
| 3,356,316 | 12/1967 | Forehand | 244—43 |
| 3,285,546 | 11/1966 | Jalbert | 244—145 |

FOREIGN PATENTS

| | | |
|---|---|---|
| 585,513 | 12/1924 | France. |
| 965,316 | 7/1964 | Great Britain. |

OTHER REFERENCES

Hewes, D. E., N.A.S.A. Technical Note D-927, September 1961, p. 5-6 and 19.

Everett L., "I Flew The Pterodactyl Flex-Wing," in Popular Mechanics, November 1961, p. 89.

Rogallo, F. M., Flexible Wing Research and Development, November 1962, p. 5 and FIG. 8.

MILTON BUCHLER, Primary Examiner

JAMES E. PITTENGER, Assistant Examiner